United States Patent Office 3,353,974
Patented Nov. 21, 1967

3,353,974
PIGMENTED MASTERBATCH COMPOSITIONS
AND A METHOD FOR PREPARING SAME
Stanley C. Trimble, Kenneth D. Hewitt, and Fred S. Thornhill, Houston, Tex., assignors to Continental Carbon Company, Houston, Tex., a corporation of Delaware
No Drawing. Filed Oct. 4, 1965, Ser. No. 492,940
9 Claims. (Cl. 106—31)

This is a continuation-in-part of application Ser. No. 330,252 filed Dec. 13, 1963, now abandoned. This invention relates to pigmented compositions generally useful in the printing, coating and molding arts. More particularly, it pertains to oil- or wax-pigment masterbatch dispersions and to a method for the preparation thereof. In narrower aspects, the present invention relates to the manufacture of oil and/or wax based compositions containing a high loading of uniformly dispersed pigments having special utility in the formulation of newspaper inks, carbon paper dopes and like compositions.

A composition comprising an oil, wax or resinous base and containing a relatively high concentration of dispersed pigment which is formed as an intermediate product for coloring or other purposes and subsequently incorporated by formulation with other components into a large batch of desired product is generally known in the art as a masterbatch composition. These compositions range in consistency from a semi-solid paste to a solid, yet somewhat yieldable product, in which the finely divided pigment component exists in a homogenously dispersed state. Depending upon the particular end use for the pigmented masterbatch composition, the maximum particle size tolerance of the pigment or agglomerate present will vary. Nevertheless, the preparation of all such masterbatch compositions requires a substantial reduction in the size of the agglomerates of commercial and industrial products capable of use for pigmentation purposes. The pigments commercially available cover a broad range of chemical substances including organic pigments and inorganic colorants. All such pigments can be prepared in a very finely divided form, i.e., in the order of a micron or even substantially smaller.

The capability of manufacturing nascent pigments in suitably subdivided form unfortunately cannot be fully utilized in many commercial applications, because of their inherent tendency to agglomerate during either the recovery step of the pigment-forming process or upon storage in bulk. Agglomerates are essentially clusters of a plurality of discrete pigment particles held together by strong surface forces. Thus, it is necessary that these pigment clusters be broken down in order to resolve the individual particles, or at least tolerably sized agglomerates thereof, into the environment in which the pigment is eventually employed.

In the preparation of a masterbatch pigment composition, which, as stated, represents a special type of pigmented composition containing a rather high loading of the pigment in the dispersing medium, it is especially difficult to achieve proper subdivision of the pigment agglomerates. Moreover, the difficulty encountered in preparing suitable masterbatch pigment compositions is augmented in those instances where the dispersing medium is a highly nonpolar material such as the hydrocarbon oils and organic waxes. A number of prior art proposals have been made for dispersing pigments in a masterbatch composition such as batch milling the components in a ball mill. All such proposals, however, are deficient from the standpoint of the manipulative problems presented in obtaining satisfactory dispersion and proper agglomerate subdivision.

It is therefore an object of this invention to provide an improved process for preparing a masterbatch pigment composition wherein the pigment exists in an extremely finely divided state and is homogeneously dispersed throughout a matrix consisting essentially of either a hydrocarbon oil, an organic wax or mixtures thereof.

Another object is to provide dustless pigment compositions of the foregoing type wherein the pigment component is composed of discrete particles having a nominal size of less than one micron.

Another object of this invention is to provide a masterbatch pigment composition wherein the concentration of pigment to matrix, i.e., loading, is very high, thus giving a product of greater pigmentation capacity per unit of composition.

A further object is to provide carbon black and iron blue masterbatch compositions which can be employed directly in the formulation of inks and various coatings thereby substantially reducing the time or in many instance eliminating need for grinding or other dispersing operations in order to homogeneously disperse the pigment within the ink, oil or coating composition.

These and other objects of the present invention will be better understood by those skilled in the art upon consideration of the detailed discussion presented hereinbelow.

In its broadest aspect, the process of this invention comprises extruding a plastic mixture of pigment and a normally liquid or liquefiable nonresinous matrix on a continuous or batch operation basis. The term plastic mixture contemplates one in which the pigment particles, including the agglomerates thereof, are substantially uniformly distributed within the matrix. The plastic mixture subjected to extrusion in accordance with this invention can be either a preformed mixture of the matrix and pigment accomplished separately of the extrusion operation, or said mixture can be formed as a preliminary adjunct in the conduct of the extrusion process. In the embodiments featuring the use of a preformed plastic mixture, it is preferred to prepare such a mixture at elevated temperature sufficient to facilitate mixing and, if necessary, the removal of water associated with the pigment in an adsorbed state. As indicated, the desiderata involved in preparing a masterbatch pigment composition consist of properly fragmentizing the pigment agglomerates and at the same time effecting dispersion thereof. The dispersive step basically consists of thoroughly "wetting" the pigment particles with the matrix component.

While it is preferred to extrude a preformed mixture of matrix and pigment from which said traces of moisture are substantially completely removed, this does not represent an absolute requirement in realizing the objectives of our process. For example, satisfactory mixing can be accomplished in an extruder where moisture removal can be effected either during the mixing or dispersing phase or even during both of such phases.

The above outlines generally our novel process for preparing masterbatch pigment compositions. Before discussing the applicable details, it is desirable to consider briefly the physical nature of the various types of pigments and matrices useful in preparing the masterbatch compositions.

The pigment component contemplated for the compositions of this invention broadly includes any of the solid substances normally used in the industry for coloring, opacifying, or otherwise modifying a specific property of the formulation, such as viscosity, or of the finished composition in which said component is employed. All of these modifying solid substances, as mentioned previously, include both inorganic and organic pigments. The latter embraces the inorganic prime pigments, organic prime pigments, various inert extended prime pigments and the amorphous carbon blacks. An enumeration of the commonly used general classes of organic pigments is as follows: the azo pigments, particularly representative of such pigments being toluidine red and para reds; the triphenylmethane pigments, e.g., malachite green; the xanthene pigments, e.g., the rhodamines; the thiazole pigments; the quinoline pigments; the anthraquinone pigments; and the various phythalocyanines.

The inorganic pigments likewise embrace a large class of colorants. Representative of such pigments are the oxides of zinc, lead and titanium, the ferrocyanide blue pigments, the yellow chromates, various green pigments comprising mixtures of a chromate yellow and a ferrocyanide blue, generally referred to as chrome green, and the numerous iron oxides.

A particularly noteworthy pigment is carbon black, which is used extensively in coating and ink applications and also as a colorant and reinforcer in rubber compositions. Carbon blacks are generally classified in terms of the process by which they are made; specifically, the channel or impingement method, the furnace method, the thermal method and the lamp black method.

The above pigments can all be readily prepared in particulate form having an ultimate particle size of a micron or less. In the case of carbon black, the resultant ultimate particle size is mainly dependent upon the specific manufacturing process employed and to a certain extent upon the particular pyrolysis conditions observed therein. The ultimate particles size of carbon blacks ranges from 5 to 200 millimicrons and as such represent the finest particle size pigments commercially available. In the case of a number of the organic and inorganic pigments referred to, precipitation practices can be observed which result in the formation of pigment particles having a nominal size in the submicron range and even smaller. Similarly, the particle size distribution of other synthetically derived inorganic pigments, such as titanium dioxide and the iron oxides, is governed by the method of the manufacture thereof.

Several important physical properties of a pigment can be measured in terms of its oil absorption characteristic. The methods that can be used to determine oil absorption are standard and are well known in the art. As a result of this test, one can obtain some idea of the pigment's particle size distribution, ability to be wetted by nonpolar liquids and its resistance toward deflocculation. The concept of oil absorption is presented here in order primarily to point out that the requisite plasticity characteristics of the pigment-matrix compositions subjected to extrusion compounding in accordance with this invention is mainly dependent upon the nature of the pigment compound.

As suitable matrices for preparing the masterbatch compositions herein concerned, one can employ all of the hydrocarbon oils and solid organic waxes or mixtures of these materials. The normally liquid hydrocarbon oils embrace a veritable legion of substantially nonvolatile hydrocarbons ranging from essentially pure paraffins to the highly aromatic and naphthenic hydrocarbons.

The organic wax matrices contemplated as suitable for preparing the masterbatch pigment compositions are not necessarily limited to those substances which are ordinarily thought of as being waxes. Additionally, there are a number of halo-, sulfo- and oxyhydrocarbons whose physical properties are wax-like in nature that are satisfactory. As an illustration, any of the higher solid mono- or dialcohols, although not strictly classified as a wax, nevertheless can be used as the matrix component in preparing the masterbatch compositions.

Representative of the typical waxes that can be employed are: the insect waxes, e.g., beeswax and Chinese wax; the vegetable waxes, e.g., candelilla, carnauba and Japan; a semi-mineral wax, such as montan wax; the various mineral waxes, e.g., ozocerite, ceresin and the numerous other forms of paraffin wax; and an animal wax, e.g., spermaceti.

With the exception of the mineral waxes, the above-enumerated waxes are essentially complex mixtures of high molecular weight organic acids, alcohols and esters. Consequently, the pure acids, alcohols, etc., constituting these naturally occurring waxes can be used in a like manner. Exemplary of such include: the carboxylic acids, such as lauric acid, myristic acid, palmitic acid, stearic acid, cerotic acid, montanic acid, melissic acid, etc. Applicable higher molecular alcohols possessing wax-like properties include: cetyl alcohol, octadecyl alcohol, ceryl alcohol, myricyl alcohol, etc. Additionally contemplated as suitable for preparing the masterbatches to which this invention is directed are the synthetic waxes, such as hydrogenated oils; the low molecular weight amphorous polyethylenes; polyesters, e.g., the high molecular weight acid esters of pentaerythritol, glycerine, trimethylolpropane, trimethylolethane, glycols, etc.; ethylene oxide polymers and the like.

Depending upon the oil absorption characteristics of the pigment used in preparing the masterbatch as well as whether the matrix is normally liquid or a solid at ambient room temperature, the weight ratio of pigment to matrix can vary extensively, i.e., from about 10 to 90 parts by weight of pigment and correspondingly from about 90 to 10 parts of the matrix.

In accordance with one embodiment of our invention, the masterbatch pigment compositions can be made by first preparing a plastic mixture of the matrix and pigment. In such a preformed mixture, the pigment is uniformly distributed throughout the matrix. Only a very minor amount of subdivision of the pigment agglomerates, if any, occurs during during this step. The preformed mixture can be obtained by simply mixing the pigment with the selected matrix. Any of the various types of mechanical mixers known in the art can be used for this purpose, examples of which are: pony mixer, rotating pan mixer, dough mixer, pug mill, ribbon mixer, putty chaser, high speed propeller type mixer and the like. Mixing is best accomplished at an elevated temperature. A suitable temperature range for mixing is between about 100 and 250° F. Where the matrix portion of the masterbatch is normally solid at room temperature, it is preferred to commence mixing at a temperature in the upper range of that indicated and thereupon allow the temperature to decrease gradually during the mixing operation.

The pigment and matrix are combined in relative proportions so as to provide a preformed mixture exhibiting a requisite degree of plasticity which, as previously indicated, is primarily dependent upon the oil absorption property of the pigment component and the loading or concentration of pigment in matrix. The plastic product of the premixing operation is discharged in a form that can be conveniently fed to the extruder. In another embodiment of the present invention, the pigment and matrix materials are mixed as an initial, but integral, part of the extrusion process. In accordance with this latter embodiment, the pigment and matrix can be fed separately in desired proportions to the initial portion of the extruder where said mixing can be achieved before the extrusion phase resulting in the formation of the dispersion.

Although three general types of mechanical working are evident in an extrusion process, namely, rubbing, kneading and shearing, it is recognized that the latter is by far the most dominant. Since shear stress is directly proportional to the viscosity of the material being worked, it is necessary that a masterbatch composition processed in accordance with this invention possesses sufficient plasticity during extrusion so that adequate deflocculation of the pigment agglomerates will result. While the shear stresses experienced in the extruder are largely governed by the plasticity characteristics of the masterbatch composition, there are, however, other factors influencing same, namely, the overall design of the extruder as such affects flow conditions, maximum shearing surface, shear rate, magnitude of back pressure generated within the extruder, temperature of the material undergoing extrusion, etc.

The extruders useful for accomplishing uniform and fine dispersion of the pigment are any of continuous types commonly employed in the art for molding thermoplastic resinous compositions. Such extruders generally consist of a power driven threaded shaft or screw which rotates in a fixed cylinder or barrel. Either the uniform or variable channel-type extuder is applicable. A satisfactory range of temperatures that can be used for extruding the masterbatch composition is from about 100 to 500° F. In most instances, a sufficiently elevated temperature in the order of that desired will be generated during the extrusion proces. Nevertheless, if it is desired to apply additional heat over and above that generated in the extrusion process, or cooling, this can be done. The extrusion process is to be conducted at conditions sufficient to discharge the extrudate to the atmosphere at an elevated temperature to volatilize any excess moisture from the same.

A variety of die arrangements can be used as the mold head for the extruder. It is preferred to employ a die containing a plurality of discharge orifices in order to increase the area of the shearing surface. The shape of the individual orifice can take the form of a square, rectangle, circle or irregular configurations. Dies having circular orifices have been found to work very well in the extrusion process herein concerned. Such an orifice shape can range in size from about $\frac{1}{64}$ to $\frac{1}{2}$ inch and even greater in diameter. The masterbatch pigment composition upon discharging from the die apertures forms short rod-like structures ranging from about $\frac{1}{4}$ to $1\frac{1}{2}$ inches in length. These can be further subdivided if desired.

The extrusion process described has been found to be surprisingly effective in breaking down pigment agglomerates to a size of a micron or even substantially smaller and concomitantly effecting homogeneous dispersion of the pigment particles throughout the matrix. The recalcitrancy of any particular pigment that might be employed presents no limitation, as all pigments, including the very difficult to handle iron blues and carbon blacks, can be satisfactorily deflocculated and dispersed in accordance with our proces. In the preparation of most masterbatches, only one extrusion need be observed in order to prepare a suitable product. However, in those instances where a particularly extensive degree of defloculation is desired or when the pigment agglomerates are difficult to defloculate, then it may be necessary to subject the masterbatch composition to several successive extrusions.

The manufacture of masterbatch pigment composition places a premium on the capacity to effect a high loading of the matrix with pigment, since the resultant intermediate product to be further formulated is thereby made a more concentrated dispersion of the coloring material. This capacity is advantageous from the standpoint of reducing the amount of matrix material required, the size of equipment needed to handle a given quantity of pigment, and accordingly the amount of product to be handled, packaged and transported. The present process utilizing extrusion and therefore primarily depending upon application of shearing forces for dispersion, operates more effectively at higher pigment loading because the same maximizes the shear action during extrusion.

The particle size distribution of the pigment content of the masterbatch can be readily determined by testing a diluted portion of the extrudate with any of the fineness gauges used for this purpose in either the protective coating or ink arts. For example, a Hegman gauge is commonly used to ascertain the particle size distribution of pigments employed in formulating various inks and carbon paper dopes. In accordance with this Hegman test, a fineness reading of not in excess of 1, or 0.1 micron, indicates a pigment particle size distribution satisfactory for such applications. The significance of the numerical rating is that it represents by a factor of 10 the particle size in microns of the major portion of the pigment particles. Also by this test, one can determine the presence of any agglomerates larger than a micron. As will be shown in the specific examples to follow, deflocculation of pigments such as carbon black and iron blue to meet the exacting requirements of the ink art can be readily achieved in accordance with our process.

Also in the preparation of masterbatches designed for the aforesaid applications, it is contemplated that minor amounts of other materials not verbally covered by the term "matrix" as hereinbefore given can be incorporated. Examples of such additives include dyes, resins, gelling or surface-active thixotropic agents, penetration aids, etc.

In order to illustrate further the nature of this invention, the following examples are provided. These examples are primarily given by way of illustration and accordingly any enumeration of details contained therein should not be interpreted as a limitation on the invention except as indicated in the appended claims.

*Example I*

This example is illustrative of a method in accordance with this invention for obtaining a carbon black masterbatch useful for the preparation of carbon paper dopes. The extruder employed was a standard Hobart extruder corresponding to the type used in retail stores for grinding meat. This extruder was purposely chosen in these introductory illustrations so as to show that complicated and special extrusion designs are not essential in realizing the adequate dispersion of the pigment in the masterbatch. Such an extruder is, of course, unsuitable for sizeable masterbatch production rates. Also the amount of work done upon the material undergoing extrusion in such a device is comparatively limited and consequently, the rise in temperature experienced therein is likewise limited. In order to simulate the heating conditions which would be secured in employing an industrial-type extruder, an extrusion run was also conducted in which the carbon black-wax mixture was pre-heated.

A preformed mixture was prepared from 12.5 pounds pelleted HAF carbon black, 10.5 pounds petrolatum and 2 pounds crude scale wax in a planetary gear mixer. The wax and carbon black were heated to a temperature of 225° F. and mixed for a period of about 25 minutes. The mixture was then allowed to cool to ambient room temperature and then passed through the extruder. A portion of the extrudate was heated to a temperature of 200° F. and passed at this temperature once again through the extruder.

A portion of each of the foregoing extrudates were formulated into carbon paper dope by diluting with ink oil and paraffin wax. The final composition of the dope was 16.66 percent carbon black, 14 percent petrolatum, 33.74 percent ink oil and 35.6 percent paraffin wax. Each of these dopes was then examined on a Hegman gauge. The formulation based on the single-pass extruded masterbatch exhibited a gauge reading of 1.0 whereas the other formulation exhibited a gauge reading of 0.5–0.6. Neither formulation contained agglomerates having a size in excess of one micron.

*Example II*

Into a small steam jacketed mixing vessel were charged 750 parts of a Milori Blue press cake and 250 parts of a mixture of $C_{16}$–$C_{18}$ linear primary alcohol. The contents were heated to 210° F. and then agitated with a portable-type propeller mixer to provide a uniform distribution of the pigment in the matrix. The pigment-wax mixture at a temperature of about 125° F. was passed twice through an extruder such as described in Example I. The extruded material was diluted to 20% pigment solids with clear paraffin ink oil. The diluted composition exhibited a Hegman gauge reading of less than 1.0.

Example III

This example illustrates the production of a masterbatch pigment composition using a commercial type extruder. The extruder was a Rietz RE-6 extruder equipped with a die plate having 80 ³⁄₁₆" diameter holes arranged in two concentric rings. SRF carbon black pellets were continuously charged to a production type gravimetric belt feeder. The carbon black had an iodine value of 30, a tint value of 69% compared to the Industrial Reference carbon black No. 1 (IRB No. 1), an oil absorption of 0.80 cc./g. and a No. 325 U.S. sieve residue of max. 0.05%. The belt feeder was adjusted for continuous delivery of 7.5 lbs. of the carbon black per minute to the feedhopper of the extruder.

A fully refined grade of paraffin wax containing 5–6% of naphthenic oil was heated to a temperature of 225° F. in a steam heated storage tank. The melted paraffin was metered through a conventional proportionating pump adjusted to deliver 5 lbs. of the melted paraffin wax to the feedhopper of the extruder. The extruder speed was maintained at 100 r.p.m. resulting in a temperature of about 330° F. at the head of the extruder.

The carbon black masterbatch composition was extruded at a rate of 12.5 lbs./min. In an 18-hr. continuous operation 13,000 lbs. of masterbatch were produced. During this extended run, representative samples of the product were periodically collected and let down with conventional waxes and oils to provide a standard test ink-dope formulation containing 17% carbon black. Each of the test samples was milled for 15 min. in a heated ball mill in order to assure proper mixing of the ingredients. All test samples exhibited a Hegman gauge reading of less than 1.0.

Similar runs to the above were conducted employing a HAF carbon black (iodine value of 85, oil absorption of 1.02 cc./g. and a tint value of 105%) and a FEF carbon black (iodine value of 46, oil absorption of 0.66 cc./g. and a tint value of 77%). Each of these masterbatch compositions was formulated into an industrial coating ink and each exhibited a Hegman gauge reading of less than 1.0.

Example IV

A ferrocyanide blue-paraffin wax masterbatch composition was prepared in a manner comparable to that described in Example III. A commercial grade of Milori Blue press cake was fed to the extruder by means of a Vibra Screw feeder. The blue pigment was discharged continuously into the feedhopper of the extruder at a uniform rate of 6.25 lbs./min. Melted paraffin wax of the type employed in Example II was continuously metered into the extruder at a rate of 6.3 lbs./min. The extruder speed was maintained at 125 r.p.m. Representative test samples of this run were compounded into an industrial coating ink containing 32% of the blue pigment. After subjecting the test formulation to 30 min. ball milling, the Hegman gauge reading for the ink was observed to be in the order of 0.25.

Example V

The equipment described in Example III was employed to prepare a TiO₂-paraffin wax masterbatch. The pigment was fed to the extruder by the gravimetric belt feeder at a uniform rate of 8.75 lbs./min. Fully refined paraffin wax at 225° F. was fed to the extruder feedhopper at a rate of 3.25 lbs./min. The resultant masterbatch was evaluated as a colorant-filler for polyethylene by mechanically mixing the masterbatch therein. The plastic composition containing the masterbatch dispersion exhibited improved coverage, coating and gloss at less settling as compared to similarly pigmented polyethylene observing a prevalent prior art practice for incorporating the pigment.

Example VI

The primary purpose of this example is to illustrate how the present invention can be advantageously utilized in the art of rubber compounding.

To a dough mixer were added approximately equal parts of a high modulus grade of HAF carbon black pellets and a highly aromatic petroleum distillate commonly used as an extender oil in the formulation of the rubber compositions. The contents of the mixer were heated to 110° C. and mixed for a brief period to yield a uniform mixture thereof. The resultant mixture at approximately the temperature indicated was slowly extruded through a Hobart extruder such as described in Example I to provide a masterbatch composition containing 50.6% carbon black and 49.4% extender oil.

The masterbatch was then incorporated into a standard test rubber recipe based on EPT rubber (ethylene propylene terpolymer) by milling the various ingredients on an open two-roll laboratory mill. The time required for incorporating the extruded product into the rubber was 6 minutes.

A similar recipe was prepared employing the mill described in which the carbon black (in pelletized form) and extruder oil were separately incorporated into the rubber. Six minutes were required to incorporate the carbon black and an additional 16 minutes to incorporate the extender oil.

Both test stocks were then milled for a comparable length of time. The two rubber compounds were cured at 310° F. and tested with the following results, the product prepared for the masterbatch being reported as test sample "A" and the comparative sample as "B."

|  | Test Sample | |
| --- | --- | --- |
|  | A | B |
| Shore hardness (20 min. cure) | 49 | 49 |
| Mooney viscosity (280° F.) | 37.8 | 38.2 |
| Microtome cut black dispersion rating (percent) | 93 | 97 |

The foregoing data show that a satisfactory dispersion of the carbon black within a rubber can be obtained by using a carbon black masterbatch prepared in accordance with this invention while realizing a substantial saving of time for incorporating the pigment and extruder oil as compared to the usual practice of incorporating said ingredients separately.

As indicated in the general description given and as is more evident from the foregoing examples, the preferred carbon black and iron blue masterbatches are those having a pigment to matrix ratio substantially higher than the minimum ratio taught herein to be applicable. The preferred masterbatches accordingly contain from about 30 to 80 parts of either iron blue or carbon black pigment and correspondingly from about 70 to 20 parts of matrix.

We claim:
1. A process for dispersing a pigment selected from the group consisting of an inorganic pigment, an organic pigment and mixtures thereof in a non-resinous matrix selected from the group consisting of a nonvolatile hydrocarbon oil, an organic wax and mixtures thereof, said matrix being capable together with the pigment of providing a mixture of sufficient plasticity to develop a high shear in an extruder which comprises extruding a plastic mixture of the pigment and matrix to the extent necessary to produce a homogeneous dispersion of the pigment throughout the matrix with concomitant reduction of the agglomerates present to a particle size of less than one micron.

2. A process in accordance with claim 1 wherein said plastic mixture is extruded at a temperature between about 100 and 500° F. and wherein the weight ratio of pigment to matrix is from about 10:90 to 90:10, respectively.

3. A carbon black masterbatch dispersion prepared in accordance with claim 2 wherein the weight ratio of carbon black to matrix is from about 80:20 to 30:70, respectively.

4. A carbon black masterbatch dispersion in accordance with claim 3 wherein said matrix is a paraffin wax.

5. A ferrocyanide blue masterbatch dispersion prepared in accordance with claim 2 wherein the weight ratio of the blue pigment to matrix is from about 80:20 to 30:70, respectively.

6. A ferrocyanide blue masterbatch dispersion in accordance with claim 5 wherein said matrix is a paraffin wax.

7. A process for dispersing a pigment in a non-resinous matrix selected from the group consisting of a nonvolatile hydrocarbon oil, an organic wax and mixtures thereof, said matrix being capable together with the pigment of providing a mixture of sufficient plasticity to develop a high shear in an extruder which comprises:
   (a) mixing the pigment and matrix in the weight ratio of from about 10:90 to 90:10, respectively, at an elevated temperature to effect removal of water associated with the pigment in an absorbed state and to provide a mixture brittle at ambient room temperature in which the pigment is substantially uniformly distributed; and
   (b) melt extruding said preformed mixture of pigment and matrix at a temperature between about 100 and 500° F. to the extent necessary to produce a homogenous dispersion of the pigment throughout the matrix with concomitant reduction of the agglomerates present to a particle size of less than one micron.

8. A method for preparing a carbon black masterbatch dispersion in accordance with claim 7 wherein the weight ratio of carbon black to matrix is from about 80:20 to 30:70, respectively.

9. A method for preparing a ferrocyanide blue masterbatch dispersion in accordance with claim 7 wherein the weight ratio of blue pigment to matrix is from about 80:20 to 30:70, respectively.

References Cited

UNITED STATES PATENTS

| | | | |
|---|---|---|---|
| 665,662 | 1/1901 | Weeks | 106—31 |
| 2,772,982 | 12/1956 | Vesce | 106—272 |
| 2,893,886 | 7/1959 | Erskine et al. | 106—272 |
| 2,904,267 | 9/1959 | Lyons | 241—26 |
| 3,296,001 | 1/1967 | Ambler et al. | 106—30 |

FOREIGN PATENTS

| | | |
|---|---|---|
| 483,611 | 5/1952 | Canada. |

ALEXANDER H. BRODMERKEL, *Primary Examiner.*

SAMUEL H. BLECH, *Examiner.*

J. B. EVANS, *Assistant Examiner.*